(12) United States Patent
Rhoads et al.

(10) Patent No.: US 8,230,337 B2
(45) Date of Patent: Jul. 24, 2012

(54) ASSOCIATING OBJECTS WITH CORRESPONDING BEHAVIORS

(75) Inventors: Geoffrey B. Rhoads, West Linn, OR (US); Tony F. Rodriguez, Portland, OR (US); Tyler J. McKinley, Lake Oswego, OR (US); Marc D. Miller, Corte Madera, CA (US); Kirstin Hierholzer, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 978 days.

(21) Appl. No.: 11/874,054

(22) Filed: Oct. 17, 2007

(65) Prior Publication Data
US 2008/0133555 A1 Jun. 5, 2008

Related U.S. Application Data (62) Division of application No. 11/359,756, filed on Feb. 21, 2006, now abandoned, which is a division of application No. 09/690,773, filed on Oct. 17, 2000, now Pat. No. 7,003,731.

(51) Int. Cl.
*G06F 3/00* (2006.01)
*H04N 1/40* (2006.01)
(52) U.S. Cl. ............... 715/704; 715/716; 358/3.28
(58) Field of Classification Search .......... 715/730–732, 715/764, 201, 234, 704, 716, 744–747; 382/100; 709/231; 725/43; 707/805; 358/3.28; 283/113
See application file for complete search history.

(56) References Cited

U.S. PATENT DOCUMENTS
4,659,919 A 4/1987 Price
(Continued)

FOREIGN PATENT DOCUMENTS
EP 493091 7/1992
(Continued)

OTHER PUBLICATIONS
Jian Zhao, "A WWW Service to Embed and Prove Digital Copyright Watermarks," May 1996.
(Continued)

*Primary Examiner* — William Bashore
*Assistant Examiner* — Andrew Tank (57) ABSTRACT

Methods and systems for associating objects with corresponding machine behaviors. Machine behaviors refer to responsive actions that are triggered when an object (which may be physical or electronic) is encountered. Examples of these behaviors include fetching a web page, executing software instructions, etc. A registration system enables machine behaviors to be associated with objects through use of object identifiers. For an electronic object such as an audio or video signal, the identifier can comprise a steganographic in-band watermark, a numeric ID or song/artist name field in a in a file header; a 128-bit hash value obtained by applying a hashing algorithm to the content data, the file header data, a portion thereof, etc. The disclosure particularly focuses on an embodiment utilizing stickers as objects, and watermarks as identifiers, but the technology can be implemented in many other, different, forms.

19 Claims, 2 Drawing Sheets

U.S. PATENT DOCUMENTS

| | | | |
|---|---|---|---|
| 4,807,031 A | 2/1989 | Broughton et al. | |
| 4,846,693 A | 7/1989 | Baer | |
| 4,953,080 A | 8/1990 | Dysart et al. | |
| 5,013,047 A | 5/1991 | Schwab | |
| 5,026,058 A | 6/1991 | Bromley | |
| 5,314,336 A | 5/1994 | Diamond et al. | |
| 5,331,547 A | 7/1994 | Laszlo | |
| 5,385,371 A | 1/1995 | Izawa | |
| 5,411,259 A | 5/1995 | Pearson et al. | |
| 5,450,490 A | 9/1995 | Jensen et al. | |
| 5,463,209 A | 10/1995 | Figh et al. | |
| 5,495,581 A | 2/1996 | Tsai | |
| 5,517,336 A | 5/1996 | Molee | |
| 5,533,124 A | 7/1996 | Smith et al. | |
| 5,557,724 A * | 9/1996 | Sampat et al. | 725/43 |
| 5,575,659 A | 11/1996 | King et al. | |
| 5,606,609 A | 2/1997 | Houser et al. | |
| 5,612,943 A | 3/1997 | Moses et al. | |
| 5,617,119 A | 4/1997 | Briggs et al. | |
| 5,621,864 A | 4/1997 | Benade et al. | |
| 5,638,513 A | 6/1997 | Ananda | |
| 5,640,193 A | 6/1997 | Wellner | |
| 5,640,647 A | 6/1997 | Hube | |
| 5,644,711 A | 7/1997 | Murphy | |
| 5,673,316 A | 9/1997 | Auerbach et al. | |
| 5,680,619 A | 10/1997 | Gudmundson et al. | |
| 5,689,561 A | 11/1997 | Pace | |
| 5,689,626 A | 11/1997 | Conley | |
| 5,742,845 A | 4/1998 | Wagner | |
| 5,743,801 A | 4/1998 | Welander | |
| 5,748,731 A | 5/1998 | Shepherd | |
| 5,754,981 A | 5/1998 | Veeneman et al. | |
| 5,765,152 A | 6/1998 | Erickson | |
| 5,765,176 A | 6/1998 | Bloomberg | |
| 5,768,426 A | 6/1998 | Rhoads | |
| 5,778,102 A | 7/1998 | Sandford et al. | |
| 5,795,213 A | 8/1998 | Goodwin | |
| 5,804,803 A * | 9/1998 | Cragun et al. | 235/375 |
| 5,810,666 A | 9/1998 | Mero et al. | |
| 5,825,892 A | 10/1998 | Braudaway et al. | |
| 5,841,978 A | 11/1998 | Rhoads | |
| 5,848,413 A | 12/1998 | Wolff | |
| 5,853,327 A | 12/1998 | Gilboa | |
| 5,855,483 A | 1/1999 | Collins | |
| 5,862,260 A | 1/1999 | Rhoads | |
| 5,864,870 A * | 1/1999 | Guck | 1/1 |
| 5,892,892 A | 4/1999 | Popat et al. | |
| 5,892,900 A | 4/1999 | Ginter et al. | |
| 5,899,700 A | 5/1999 | Williams et al. | |
| 5,900,608 A | 5/1999 | Iida | |
| 5,902,353 A | 5/1999 | Reber et al. | |
| 5,903,729 A | 5/1999 | Reber et al. | |
| 5,905,248 A | 5/1999 | Russell et al. | |
| 5,905,800 A | 5/1999 | Moskowitz et al. | |
| 5,906,369 A | 5/1999 | Brennan | |
| 5,915,027 A | 6/1999 | Cox et al. | |
| 5,915,115 A | 6/1999 | Talati | |
| 5,932,863 A | 8/1999 | Rathus et al. | |
| 5,933,798 A | 8/1999 | Linnartz | |
| 5,938,726 A | 8/1999 | Reber et al. | |
| 5,940,595 A | 8/1999 | Reber et al. | |
| 5,954,332 A | 9/1999 | Mero et al. | |
| 5,954,515 A | 9/1999 | Iggulden | |
| 5,956,877 A | 9/1999 | Raasch et al. | |
| 5,959,281 A | 9/1999 | Domiteaux | |
| 5,974,548 A | 10/1999 | Adams | |
| 5,978,773 A | 11/1999 | Hudetz et al. | |
| 5,982,736 A | 11/1999 | Pierson | |
| 5,995,105 A | 11/1999 | Reber et al. | |
| 6,052,486 A | 4/2000 | Knowlton et al. | |
| 6,064,779 A | 5/2000 | Neukermans et al. | |
| 6,081,827 A | 6/2000 | Reber et al. | |
| 6,082,774 A | 7/2000 | Schlauch | |
| 6,084,528 A | 7/2000 | Beach et al. | |
| 6,122,403 A | 9/2000 | Rhoads | |
| 6,138,151 A | 10/2000 | Reber et al. | |
| 6,160,540 A | 12/2000 | Fishkin et al. | |
| 6,164,534 A | 12/2000 | Rathus et al. | |
| 6,190,174 B1 | 2/2001 | Lam | |
| 6,199,048 B1 | 3/2001 | Hudetz et al. | |
| 6,200,216 B1 | 3/2001 | Peppel | |
| 6,216,228 B1 * | 4/2001 | Chapman et al. | 713/176 |
| 6,229,924 B1 | 5/2001 | Rhoads et al. | |
| 6,243,480 B1 * | 6/2001 | Zhao et al. | 382/100 |
| 6,249,226 B1 | 6/2001 | Harrison et al. | |
| 6,256,398 B1 | 7/2001 | Chang | |
| 6,307,949 B1 | 10/2001 | Rhoads | |
| 6,309,690 B1 | 10/2001 | Brogger et al. | |
| 6,311,214 B1 | 10/2001 | Rhoads | |
| 6,314,457 B1 | 11/2001 | Schena et al. | |
| 6,324,573 B1 | 11/2001 | Rhoads | |
| 6,332,031 B1 | 12/2001 | Rhoads et al. | |
| 6,345,256 B1 | 2/2002 | Milsted et al. | |
| 6,381,341 B1 | 4/2002 | Rhoads | |
| 6,385,329 B1 | 5/2002 | Sharma et al. | |
| 6,400,272 B1 | 6/2002 | Holtzman et al. | |
| 6,408,082 B1 | 6/2002 | Rhoads et al. | |
| 6,421,070 B1 | 7/2002 | Ramos et al. | |
| 6,424,725 B1 | 7/2002 | Rhoads et al. | |
| 6,425,525 B1 | 7/2002 | Swaminathan | |
| 6,434,561 B1 | 8/2002 | Durst, Jr. et al. | |
| 6,445,460 B1 | 9/2002 | Pavley | |
| 6,448,979 B1 | 9/2002 | Schena et al. | |
| 6,449,377 B1 | 9/2002 | Rhoads | |
| 6,456,725 B1 | 9/2002 | Cox et al. | |
| 6,464,503 B1 | 10/2002 | Heit et al. | |
| 6,470,096 B2 | 10/2002 | Davies et al. | |
| 6,505,160 B1 | 1/2003 | Levy et al. | |
| 6,510,234 B1 | 1/2003 | Cox et al. | |
| 6,516,079 B1 | 2/2003 | Rhoads et al. | |
| 6,522,770 B1 | 2/2003 | Seder et al. | |
| 6,526,449 B1 | 2/2003 | Philyaw et al. | |
| 6,535,614 B1 | 3/2003 | Kimura et al. | |
| 6,535,617 B1 | 3/2003 | Hannigan et al. | |
| 6,542,927 B2 | 4/2003 | Rhoads | |
| 6,542,933 B1 | 4/2003 | Durst, Jr. et al. | |
| 6,549,922 B1 * | 4/2003 | Srivastava et al. | 1/1 |
| 6,549,933 B1 | 4/2003 | Barrett | |
| 6,553,129 B1 | 4/2003 | Rhoads | |
| 6,567,533 B1 | 5/2003 | Rhoads | |
| 6,580,808 B2 | 6/2003 | Rhoads | |
| 6,590,996 B1 | 7/2003 | Reed et al. | |
| 6,591,252 B1 | 7/2003 | Young | |
| 6,611,607 B1 | 8/2003 | Davis et al. | |
| 6,614,914 B1 | 9/2003 | Rhoads et al. | |
| 6,636,242 B2 * | 10/2003 | Bowman-Amuah | 715/764 |
| 6,636,249 B1 | 10/2003 | Rekimoto | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,681,028 B2 | 1/2004 | Rodriguez et al. | |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,735,324 B1 | 5/2004 | McKinley et al. | |
| 6,760,463 B2 | 7/2004 | Rhoads | |
| 6,763,123 B2 | 7/2004 | Reed et al. | |
| 6,768,809 B2 | 7/2004 | Rhoads et al. | |
| 6,775,392 B1 | 8/2004 | Rhoads | |
| 6,798,894 B2 | 9/2004 | Rhoads | |
| 6,813,366 B1 | 11/2004 | Rhoads | |
| 6,834,308 B1 * | 12/2004 | Ikezoye et al. | 709/231 |
| 6,856,977 B1 | 2/2005 | Adelsbach | |
| 6,879,701 B1 | 4/2005 | Rhoads | |
| 6,917,724 B2 | 7/2005 | Seder et al. | |
| 6,920,232 B2 | 7/2005 | Rhoads | |
| 6,947,571 B1 | 9/2005 | Rhoads et al. | |
| 6,970,886 B1 | 11/2005 | Levy | |
| 6,975,746 B2 | 12/2005 | Davis et al. | |
| 6,988,202 B1 | 1/2006 | Rhoads et al. | |
| 6,996,252 B2 | 2/2006 | Reed et al. | |

| | | | | | | |
|---|---|---|---|---|---|---|
| 7,003,731 B1* | 2/2006 | Rhoads et al. ............... 715/768 | | 2002/0009208 A1 | 1/2002 | Alattar et al. |
| 7,024,016 B2 | 4/2006 | Rhoads et al. | | 2002/0012446 A1 | 1/2002 | Tanaka |
| 7,027,614 B2 | 4/2006 | Reed | | 2002/0023148 A1 | 2/2002 | Ritz et al. |
| 7,035,427 B2 | 4/2006 | Rhoads | | 2002/0049967 A1 | 4/2002 | Haseltine et al. |
| 7,044,395 B1 | 5/2006 | Davis et al. | | 2002/0059162 A1 | 5/2002 | Shinoda et al. |
| 7,051,086 B2 | 5/2006 | Rhoads et al. | | 2002/0062382 A1 | 5/2002 | Rhoads et al. |
| 7,054,465 B2 | 5/2006 | Rhoads | | 2002/0069370 A1 | 6/2002 | Mack |
| 7,058,223 B2 | 6/2006 | Cox | | 2002/0073214 A1 | 6/2002 | Iinuma |
| 7,062,069 B2 | 6/2006 | Rhoads | | 2002/0075298 A1 | 6/2002 | Schena et al. |
| 7,065,559 B1 | 6/2006 | Weiss | | 2002/0080271 A1 | 6/2002 | Eveleens et al. |
| 7,089,222 B1* | 8/2006 | Lannert et al. ............... 706/47 | | 2002/0080396 A1 | 6/2002 | Silverbrook et al. |
| 7,095,871 B2 | 8/2006 | Jones et al. | | 2002/0085759 A1 | 7/2002 | Davies et al. |
| 7,111,170 B2 | 9/2006 | Rhodes et al. | | 2002/0102966 A1 | 8/2002 | Lev et al. |
| 7,113,614 B2 | 9/2006 | Rhoads | | 2002/0131076 A1 | 9/2002 | Davis |
| 7,139,408 B2 | 11/2006 | Rhoads et al. | | 2002/0153661 A1 | 10/2002 | Brooks et al. |
| 7,158,654 B2 | 1/2007 | Rhoads | | 2002/0155893 A1 | 10/2002 | Swanberg et al. |
| 7,164,780 B2 | 1/2007 | Brundage et al. | | 2002/0176003 A1 | 11/2002 | Seder et al. |
| 7,171,016 B1 | 1/2007 | Rhoads | | 2002/0186886 A1 | 12/2002 | Rhoads |
| 7,174,031 B2 | 2/2007 | Rhoads et al. | | 2002/0196272 A1 | 12/2002 | Ramos et al. |
| 7,177,443 B2 | 2/2007 | Rhoads | | 2003/0037075 A1 | 2/2003 | Hannigan et al. |
| 7,190,491 B2* | 3/2007 | Silverbrook et al. ........ 358/3.28 | | 2003/0040957 A1 | 2/2003 | Rhodes et al. |
| 7,213,757 B2 | 5/2007 | Jones et al. | | 2003/0105730 A1 | 6/2003 | Davis et al. |
| 7,224,819 B2 | 5/2007 | Levy et al. | | 2003/0130954 A1 | 7/2003 | Carr et al. |
| 7,248,717 B2 | 7/2007 | Rhoads | | 2004/0005093 A1 | 1/2004 | Rhoads |
| 7,261,612 B1 | 8/2007 | Hannigan et al. | | 2004/0190750 A1 | 9/2004 | Rodriguez et al. |
| 7,305,104 B2 | 12/2007 | Carr et al. | | 2004/0240704 A1 | 12/2004 | Reed |
| 7,308,110 B2 | 12/2007 | Rhoads | | 2004/0264733 A1 | 12/2004 | Rhoads et al. |
| 7,313,251 B2 | 12/2007 | Rhoads | | 2005/0041835 A1 | 2/2005 | Reed et al. |
| 7,319,775 B2 | 1/2008 | Sharma et al. | | 2005/0058318 A1 | 3/2005 | Rhoads |
| 7,330,564 B2 | 2/2008 | Brundage et al. | | 2005/0192933 A1 | 9/2005 | Rhoads et al. |
| 7,369,678 B2 | 5/2008 | Rhoads | | 2005/0243369 A1* | 11/2005 | Goldstein et al. ............ 358/1.18 |
| 7,377,421 B2 | 5/2008 | Rhoads | | 2006/0013435 A1 | 1/2006 | Rhoads |
| 7,391,880 B2 | 6/2008 | Reed et al. | | 2006/0041591 A1 | 2/2006 | Rhoads |
| 7,403,299 B2 | 7/2008 | Takahashi | | 2006/0251291 A1 | 11/2006 | Rhoads |
| 7,406,214 B2 | 7/2008 | Rhoads et al. | | 2007/0055884 A1 | 3/2007 | Rhoads |
| 7,424,131 B2 | 9/2008 | Alattar et al. | | 2007/0108287 A1 | 5/2007 | Davis et al. |
| 7,427,030 B2 | 9/2008 | Jones et al. | | 2007/0154064 A1 | 7/2007 | Rhoads et al. |
| 7,433,491 B2 | 10/2008 | Rhoads | | 2007/0276841 A1 | 11/2007 | Rhoads et al. |
| 7,444,000 B2 | 10/2008 | Rhoads | | 2007/0276928 A1 | 11/2007 | Rhoads et al. |
| 7,444,392 B2 | 10/2008 | Rhoads et al. | | 2008/0121728 A1 | 5/2008 | Rodriguez |
| 7,450,734 B2 | 11/2008 | Rodriguez et al. | | 2008/0133555 A1 | 6/2008 | Rhoads et al. |
| 7,460,726 B2 | 12/2008 | Levy et al. | | 2008/0292134 A1 | 11/2008 | Sharma et al. |
| 7,466,840 B2 | 12/2008 | Rhoads | | 2009/0012944 A1 | 1/2009 | Rodriguez et al. |
| 7,486,799 B2 | 2/2009 | Rhoads | | 2009/0116687 A1 | 5/2009 | Rhoads et al. |
| 7,502,759 B2 | 3/2009 | Hannigan et al. | | 2009/0125475 A1 | 5/2009 | Rhoads et al. |
| 7,508,955 B2 | 3/2009 | Carr et al. | | 2009/0232352 A1 | 9/2009 | Carr et al. |
| 7,515,733 B2 | 4/2009 | Rhoads | | 2009/0286572 A1 | 11/2009 | Rhoads et al. |
| 7,536,034 B2 | 5/2009 | Rhoads et al. | | 2009/0290754 A1 | 11/2009 | Rhoads |
| 7,537,170 B2 | 5/2009 | Reed et al. | | 2010/0027837 A1 | 2/2010 | Levy et al. |
| 7,545,952 B2 | 6/2009 | Brundage et al. | | 2010/0045816 A1 | 2/2010 | Rhoads |
| 7,564,992 B2 | 7/2009 | Rhoads | | 2010/0062819 A1 | 3/2010 | Hannigan et al. |
| RE40,919 E | 9/2009 | Rhoads | | 2010/0094639 A1 | 4/2010 | Rhoads |
| 7,602,978 B2 | 10/2009 | Levy et al. | | 2010/0142749 A1 | 6/2010 | Ellingson et al. |
| 7,628,320 B2 | 12/2009 | Rhoads | | 2010/0172540 A1 | 7/2010 | Davis et al. |
| 7,643,649 B2 | 1/2010 | Davis et al. | | 2010/0198941 A1 | 8/2010 | Rhoads |
| 7,650,009 B2 | 1/2010 | Rhoads | | 2011/0007936 A1 | 1/2011 | Rhoads |
| 7,653,210 B2 | 1/2010 | Rhoads | | 2011/0026777 A1 | 2/2011 | Rhoads et al. |
| 7,657,058 B2 | 2/2010 | Sharma | | | | |
| 7,685,426 B2 | 3/2010 | Ramos et al. | | | | |
| 7,693,300 B2 | 4/2010 | Reed et al. | | | | |
| 7,697,719 B2 | 4/2010 | Rhoads | | | | |
| 7,711,143 B2 | 5/2010 | Rhoads | | | | |
| 7,738,673 B2 | 6/2010 | Reed | | | | |
| 7,747,038 B2 | 6/2010 | Rhoads | | | | |
| 7,751,588 B2 | 7/2010 | Rhoads | | | | |
| 7,751,596 B2 | 7/2010 | Rhoads | | | | |
| 7,756,290 B2 | 7/2010 | Rhoads | | | | |
| 7,760,905 B2 | 7/2010 | Rhoads et al. | | | | |
| 7,762,468 B2 | 7/2010 | Reed et al. | | | | |
| 7,787,653 B2 | 8/2010 | Rhoads | | | | |
| 7,792,325 B2 | 9/2010 | Rhoads et al. | | | | |
| 7,822,225 B2 | 10/2010 | Alattar | | | | |
| 7,837,094 B2 | 11/2010 | Rhoads | | | | |
| 2001/0001854 A1 | 5/2001 | Schena et al. | | | | |
| 2001/0021978 A1 | 9/2001 | Okayasu et al. | | | | |
| 2001/0034705 A1 | 10/2001 | Rhoads et al. | | | | |
| 2001/0047426 A1 | 11/2001 | Hunter | | | | |
| 2001/0055407 A1 | 12/2001 | Rhoads | | | | |
| 2002/0006212 A1 | 1/2002 | Rhoads et al. | | | | |

FOREIGN PATENT DOCUMENTS

| | | |
|---|---|---|
| EP | 975147 | 1/2000 |
| EP | 1001605 | 5/2000 |
| JP | 7115474 | 5/1995 |
| WO | WO97/43736 | 11/1997 |
| WO | WO9803923 | 1/1998 |
| WO | WO00/07356 | 2/2000 |
| WO | WO00/26749 | 5/2000 |
| WO | WO0115021 | 3/2001 |
| WO | WO01/61987 | 8/2001 |
| WO | WO0173586 | 10/2001 |
| WO | WO01/84438 | 11/2001 |
| WO | WO02/03328 | 1/2002 |

OTHER PUBLICATIONS

Jean-Henry Morin and Dimitri Konstantas, "Hypernews: A Media Application for the Commercialization of an Electronic Newspaper," ACM, 1998.

James Kempf, "Cross-Address Space Dynamic Linking," Sep. 1992.
"1999 NFL Rookies Featured in Upper Deck's PowerDeck Lineup," Upper Deck press release, Aug. 17, 1999, 2 pages.
Acken, "How Watermarking Adds Value to Digital Content," Communications of the ACM, vol. 41, No. 7, Jul. 1998, pp. 75-77.
Alattar, "'Smart Images' Using Digitmarc's Watermarking Technology," Proc. SPIE vol. 3971: Security and Watermarking of Multimedia Contents II, Jan. 24-26, 2000, pp. 264-273.
"Digimarc Turns Online Images into Powerful Marketing Agents," Digimarc press release, Jul. 20, 1998, 3 pages.
McDonald, "Making a MARC: Digimarc's MediaBridge fastens print advertising to the Internet," Publishing & Production Executive, vol. 14, No. 6, Jun. 2000, pp. 40, 42 and 44.
"Newly Released Magic: The Gathering Interactive Encyclopedia CD-ROM Makes Every Magic Card Ever Printed Available for Electronic Play," Wizards of the Coast press release, Nov. 10, 1999, 2 pages.
"Overlay Plug-In User's Guide," Plug-in-Systems, 1996, 12 pages. the ACM, vol. 41, No. 7, Jul. 1998, pp. 67-72.
Yeung et al., "Digital Watermarks: Shedding Light on the Invisible," IEEE Micro, vol. 18, No. 6, Nov./Dec. 1998, pp. 32-41.
Zhao et al., "In Business Today and Tomorrow," Communications of the ACM, vol. 41, No. 7, Jul. 1998, pp. 67-72.
Arai et al., Retrieving Electronic Documents with Real-World Objects on InteractiveDESK, Nov. 14, 1995, UIST '95, pp. 37-38.
Arai et al., "InteractiveDESK: A Computer-Augmented Desk Which Responds to Operations on Real Objects," CHI '95 Mosaic of Creativity, May 7-11, 1995, pp. 141-142.
Berners-Lee et al., "World-Wide Web: The Information Universe," Electronic Networking, vol. 2, No. 1, Spring 1992, pp. 52-58.
Berners-Lee et al., "The World-Wide Web," Computer Networks and ISDN Systems 25 (1992) pp. 454-459.
Buyens, "Building Net Sites with Windows NT," Excerpt from Chapter 16, Advanced Web Services, 1996, 7 pages.
Davison, "Clickable Images in HTML," Dr. Dobbs Journal, Sep. 1995, 9 pages.
Lungstrand et al., "WebStickers: Using Physical Tokens to Access, Manage and Share Bookmarks to the Web," DARE 2000, Apr. 12, 2000, 9 pages.
Nickerson, "WorldWideWeb: Hypertext from CERN," Computers in Libraties, Dec. 1992, vol. 12, No. 11, pp. 75-78.
NCSA Imagemap Tutorial, http://hoohoo.ncsa.uiuc.edu/docs/tutorials/imagemapping.html, Nov. 5, 1995, 5 pages.
Rekimoto et al., "CyberCode: Designing Augmented Reality Environments with Visual Tags," DARE 2000, Apr. 12, 2000, 10 pages.
Rekimoto et al., "Augment-able Reality: Situation Communication Through Physical and Digital Spaces," Proc. of 2d Int. Symp. on Wearable Computers, Oct. 1998.
Want et al., "Bridging Physical and Virtual Worlds with Electronic Tags," CHI 99, May 15, 1999, pp. 370-377.
Webcom HTML Guide, http://www.webcom.com/html/tutor/imap.sub.--concepts.shtml, 1994, 2 pages.
U.S. Appl. No. 09/343,104, filed Jun. 29, 1999, Tony F. Rodriguez, et al.
U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L Davis, et al.
U.S. Appl. No. 12/872,989, filed Aug. 31, 2010, Geoffrey B Rhoads.
U.S. Appl. No. 12/912,461, filed Oct. 26, 2010, Adnan M. Alattar.
U.S. Appl. No. 12/953,190, filed Nov. 23, 2010, Geoffrey B. Rhoads.
Prosecution excerpts from U.S. Appl. No. 12/244,531 of Rhoads et al (original claims, and Apr. 12, 2011 Non-Final Office Action).

* cited by examiner

ASSOCIATING OBJECTS WITH CORRESPONDING BEHAVIORS

RELATED APPLICATION DATA

This application is a division of application Ser. No. 11/359,756, filed Feb. 21, 2006, which is a division of application Ser. No. 09/690,773, filed Oct. 17, 2000 (now patent 7,003,731). These applications are incorporated herein by reference.

The subject matter of this application is also related to that disclosed in patents and publications U.S. Pat. Nos. 5,862,260, 6,614,914, 6,947,571 and 20050013462, and in applications Ser. No. 09/633,587 (filed Aug. 7, 2000), and 60/134,782 (filed May 19, 1999; published as an appendix in U.S. Pat. No. 6,311,214). These documents (but only the appendix portion of U.S. Pat. No. 6,311,214) are hereby incorporated by reference.

TECHNICAL FIELD

The present technology relates to multimedia signal processing, and in particular relates to audio or video object-based initiation of different behaviors (actions).

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's copending application Ser. No. 09/503,881 and U.S. Pat. No. 5,862,260, which are hereby incorporated by reference.

One particular embodiment of the technology detailed herein is a system for enabling a user to associate a machine behavior with an object. That system includes a registration system and a database management system. The registration system enables a user to specify a machine behavior to be associated with an object via an object identifier. The database management system is in communication with the registration system, and receives/maintains records associating object identifiers with machine behaviors. Thus, the database management system is operable to receive object identifiers and, in response, to initiate the machine behavior or behaviors associated with those object identifiers.

The registration system can include a network interface that enables users to associate behaviors with object identifiers from remote client computers.

The object identifiers can comprise watermark identifiers which are embedded in watermarks on corresponding objects.

An exemplary machine behavior includes fetching a web site relating to an object carrying the object identifier.

The above-noted system can include a user interface that enables a user to view an image of an object along with an image of a behavior to be associated with the object. This interface can include a control that enables the user to associate the object with the behavior, and can be operable to communicate a database structure to the database management system specifying an object identifier for the object and a description of the behavior.

Another embodiment is a method for enabling a user to associate a machine behavior with an object. This method includes presenting a user interface enabling a user to specify an object and a machine behavior to be associated with the object; receiving a specification of an object and a behavior to be associated with that object; and updating a database with an entry specifying an object identifier of the object and the behavior. Thus, the database is operable to initiate the behavior in response to receiving an object identifier decoded from machine readable code on the object.

Specification of the object can include a registration identifier provided on the object or packaging of the object. The registration identifier can be embedded in a watermark on the object.

Further features will become apparent with reference to the following detailed description and accompanying drawings.

DETAILED DESCRIPTION

The principles of applicants' technology are described and illustrated with reference to specific implementations. However, it will be recognized that the technology can be implemented in many other, different forms.

The following description details a system and related methods for associating watermark enabled objects with machine behaviors. To illustrate the system, the description focuses on an example of watermark enabled stickers. As noted, the system applies more broadly to watermarking both physical and electronic objects. In particular, aspects of the system may be used for watermarking media signals like images, video and audio, as well as applying watermarks to physical objects. Watermarks may be applied to physical objects by placing a watermarked image on a physical object, by modulating the surface topology of the object, etc. See U.S. Pat. No. 5,862,260, for more information about watermark embedding of and decoding from physical and electronic objects.

Stickers in all their varieties have found an enduring place in our society. From the workplace (Post-It® brand message notes), to kids in a classroom, stickers have an inherent value associated with them, whether it be functional (seals, labels, etc.) or just to identify yourself with a particular affinity group (bumper stickers on cars). By placing a watermark on stickers they can be used in novel ways. By encoding a set of stickers with a watermark during production, specific machine behaviors can be assigned to them. These behaviors can be associated or even possibly changed by anyone from the manufacturer through the distributor, all the way to the end-user. In addition, the users can create their own watermark enabled stickers by creating an image, embedding a watermark in it, and associating the watermark with one or more machine behaviors.

These behaviors may include, but are not limited to the following:

Taking the user to a web-site linked to the watermark via a network address of the web-site or index to the network address.

Opening an email client to email to a specific person (e.g., a person whose email address is stored in the machine behavior description associated with the watermark).

Launching the user into an Interframe Relay Chat (IRC) session that other people with the same sticker can participate in.

Authenticating the user as part of a process of accessing a network resource, such as account information or access to a computer network.

Authentication the user in an electronic commerce transaction performed on a computer network.

Sending an electronic card.

Placing a phone or video-conference call.

As props in a computer game. For example, the prop is a multi-sided, or multi-faceted object, where each side or facet has a watermarked image conveying a different message used to control the game. The computer game includes a watermark decoder for extracting the messages from image frames captured of the prop. The message may directly carry the message or act as an index to a more detailed game instruction in a database, such as an instruction that changes over time based on changes to the corresponding database entry by the user or game manufacturer.

As a visual aide for disabled users.

Anywhere where machine vision is not feasible.

In each of the above applications, the watermark carries information that links the watermarked object (e.g., sticker) with a machine behavior. To trigger this behavior, a watermark decoder application captures an image or images of the watermarked sticker, extracts the watermark, and uses information embedded in the watermark to determine the associated machine behavior. The watermark decoder then takes action to initiate the machine behavior associated with the watermark.

For some applications, it is useful to enable the user to control the behavior associated with a watermarked object. This type of management may be handled by creating accounts for users and providing access to the accounts via some authentication method (email, passwords, etc.). For a number of reasons, these access methods can be problematic (losing passwords, asking kids for their email addresses, etc.). As an alternative, watermarks may be used to manage the process of associating behaviors with a watermarked object.

For example, in the scenario where a user wants to assign behaviors to a set of watermarked stickers they have received, they can hold up the first sticker (or its packaging), and be taken to a registration application to activate the stickers in the pack.

Figure 1:
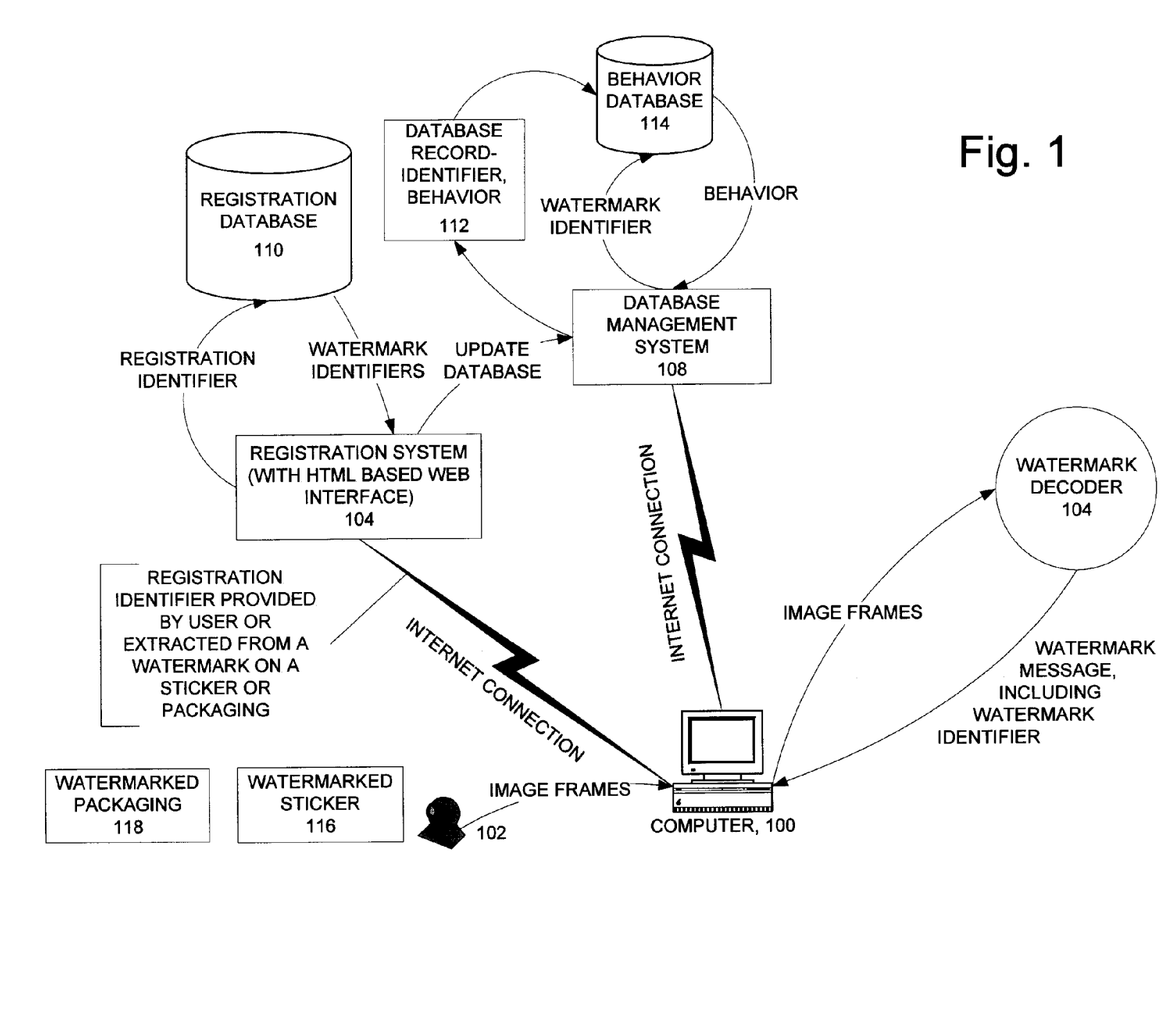
FIG. 1 is a system diagram depicting a system for associating watermark enabled objects with machine behaviors, and for triggering those behaviors in response to decoding watermarks.

FIG. 1 is a system diagram depicting a system for associating watermark enabled objects with machine behaviors, and for triggering those behaviors in response to decoding watermarks. The system depicted in FIG. 1 is implemented on a computer network, namely, the Internet. The user accesses the system via a computer 100 connected to the Internet. The computer broadly encompasses a variety of devices, such as Personal Computers, set-top boxes, personal digital assistants, Internet appliances, telephones (including wireless devices), audio and video players, and imaging devices (CCD or CMOS cameras, camcorders, printers, fax machines, copiers, etc.). The computer is connected to an image capture device 102, such as a PC camera or scanner, and includes watermark decoder software for decoding watermarks from images captured from the image capture device.

The system architecture shown in FIG. 1 includes a system (106) for managing the process of assigning behaviors to watermarked objects as well as a database management system (108) for initiating behaviors in response to decoding watermarks from the objects. These two systems may be integrated or implemented separately. In the application depicted here, the registration system and database management system are accessible via a network interface using standard network technology, including HTML, XML, and TCP/IP. A watermark embedding system has previously embedded watermarks carrying watermark identifiers into stickers. The stickers (or packages of them) also include a registration identifier used to activate the behaviors associated with them.

The registration system maintains a registration database including records of the registration identifiers and corresponding watermark identifiers. The registration identifiers are serialized numbers corresponding to the watermarked stickers or packages of them. The watermark identifiers are a form of object identifiers that are encoded into the watermarks on the corresponding stickers. The registration system maintains a registration database 110 of data records indicating the watermark identifiers associated with each registration identifier. When a user selects a behavior to be associated with a watermarked object via the registration system, the registration system sends an update 112 to a behavior database 114 specifying the behavior to be associated with a corresponding watermark identifier. In response, the database management system 108 updates its database to include a record that indicates the behavior associated with a particular watermark identifier.

The database management system 108 is also responsible for supporting machine behavior associated with a watermarked sticker in response to detection of the watermark on the sticker. It has a network interface for communicating with other computers over the Internet. In particular, it receives requests in the form of an XML packet from a watermark decoding computer, extracts a watermark identifier from the packet and looks up the associated behavior or behaviors in the behavior database. It then initiates the associated behavior. The details of how this behavior is carried out depend on the application and type of behavior.

In a typical registration process, the user accesses the registration system via a registration web site, which presents an HTML interface to the users' computers. The user may fetch the HTML pages of this interface using an Internet browser or application program, like the watermark decoder application executing on the computer 100. This interface enables the user to enter a registration identifier to start a process of associating behaviors with watermark identifiers embedded in watermarked stickers. In response to a registration identifier, the registration system returns a page that enables the user to specify the behavior. In the case where the behavior is linking a watermarked sticker to a web site, the user specifies the network address of the web site, such as a URL or IP address. In the case where the behavior is linking a watermarked sticker to an email message, the user specifies the email address of the email recipient.

As noted above, there are many other types of watermark enabled behaviors. They can be classified as providing information to the watermark decoding computer, launching some software program or machine action, or a combination of both. Table 1 below gives some examples of behaviors, and the related information and actions.

TABLE 1

| Behavior Type | Information Returned to Decoding Computer | Associated Machine or Software Actions |
|---|---|---|
| linking to web site | URL, web page | launching browser on client to fetch/render web page at URL |
| opening an email client | email address of target recipient | launching email client and populating address field with target recipient |
| Starting a chat session | address of chat session | launching chat application (watermarks on the stickers can be designed such that only those holding the stickers can gain access to the chat session, each by showing the sticker to his or her watermark decoder enabled camera) |
| accessing account information or other network resources | address of account information | launching of browser application to access account information through a web interface; supplying user authentication information from watermarked object and/or from user (user password, user name, log on, etc.) |
| Sending an electronic card | card template | launching client application to enable the user to design the card and add personal message, launching email application to send electronic card (or link to electronic card) |
| placing a phone or video conference call | phone number or IP address of destination | launching application to initiate phone call over the internet or telephone network |
| props in an interactive computer game | identifier of prop, and possibly other context information, such as game player holding the prop, etc. | game application receives prop and context information and responds accordingly |
| visual aid for disabled users | returns information in the form of graphics, audio, or video (may provide address of audio or video content at an audio or video server on the Internet) | browser, or other media player applications render the information (such as the streaming media) on the decoding computer |
| machine control | machine instruction | machine or software executes instruction |

For a given application, the registration system provides information to the user to enable the user to select the behavior and provide pertinent information, such as URL, IP address, phone number, email address, content file (e.g., audio, image or video file), etc. The registration system formulates a description of the behavior, associates it with the watermark identifier specified by the user, and creates an update 112 to the behavior database.

The user then uses the stickers or shares them with friends. To trigger the behavior of a sticker, a user captures an image of the sticker with an image capture device 102 using a watermark decoder application 104 executing on the computer 100. The watermark decoder extracts the watermark identifier from a watermark embedded in the image on the sticker. It then sends the watermark identifier to the database management system 108 via the Internet, which in turn, looks up the associated behavior. The database management system then triggers the associated behavior by sending information, or instructions back to the decoding computer. The decoding computer renders the information, and launches a software or other machine action associated with the instructions returned from the database. The database need not be implemented in a remote computer. For example, the database may be implemented in the watermark decoding computer or device.

As an enhancement to the registration process, objects may carry watermarks that automatically link the user to the registration web site. For example, one side of the sticker 116 or its packaging 118 may contain a watermark with the network address or an index to a network address of the registration web site. The user shows this part of the sticker or packaging to the image capture device. The watermark decoder extracts the watermark and looks up the network address in the behavior database, and launches a browser to fetch the registration web site. The watermark may also carry the registration identifier. In this case, the registration web site can tailor the web page returned to the user to be specific to the watermarked object. If the user or someone else previously associated a behavior with the sticker, the registration web site returns the current status associated with the registration identifier and the behaviors associated with the watermarked objects linked to that registration identifier. To get detailed information about particular watermarked objects during the registration process, the user can show the watermarked object to a camera, and use a watermark decoder to extract the watermark identifier and supply it to the registration system. In response, the registration system takes the watermark identifier, queries the behavior database via the database management system, and returns a description of the associated behaviors. This approach provides a simple and automated process of activating watermark enabled objects.

For more information about an object identifier registration system and system for linking objects with machine behaviors, see U.S. patent application Ser. No. 09/571,422, which is hereby incorporated by reference.

Figure 2:
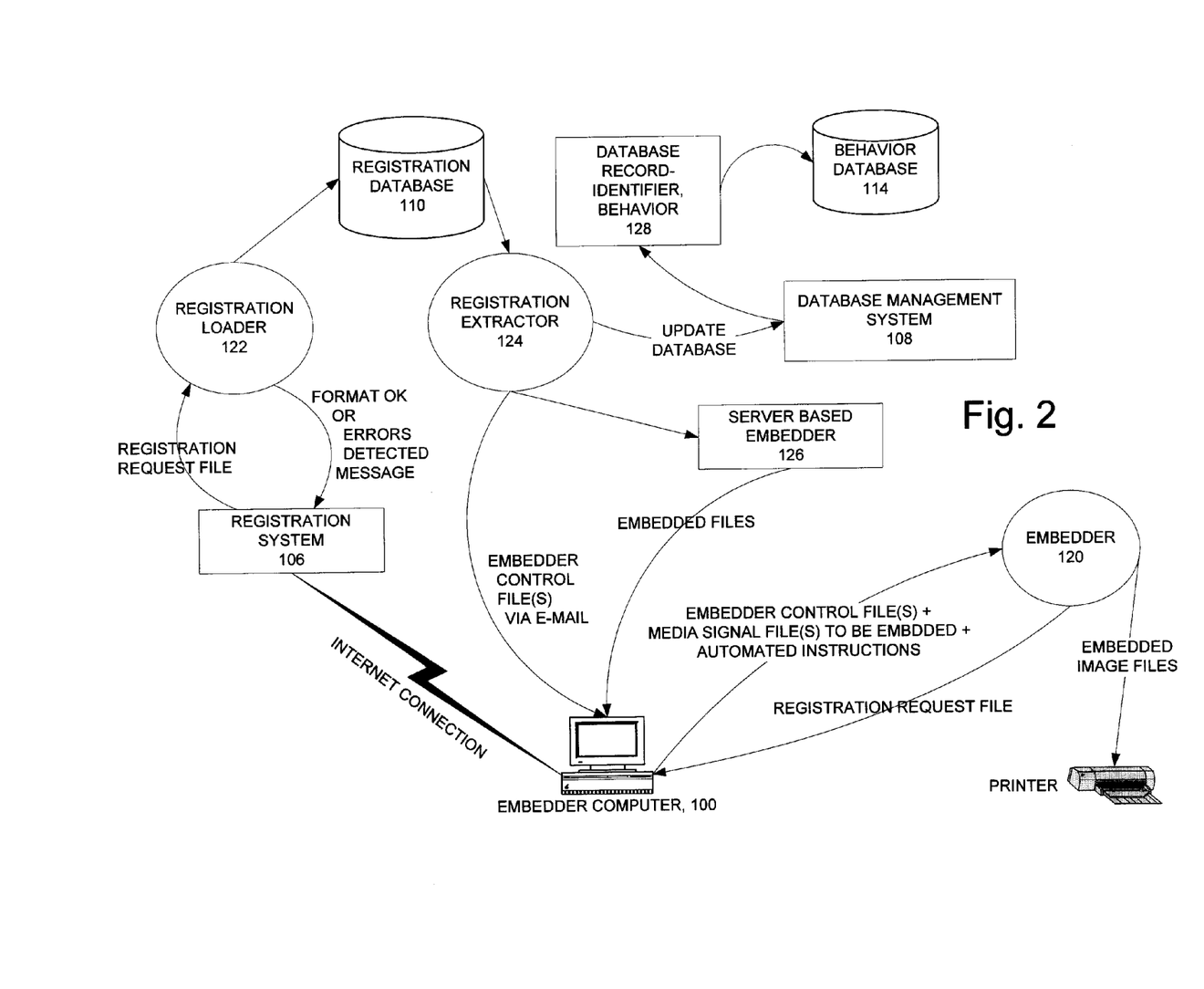
FIG. 2 is a diagram depicting a variant of the system shown in FIG. 1 showing system components for enabling users to perform watermark identifier registration and embedding.

In some applications, the user may wish to create his or her own watermarked objects. FIG. 2 illustrates a system that enables users to assign watermark identifiers to corresponding behaviors and objects and update the behavior database. In this particular system, the user's computer includes a watermark embedder application (120). However, the embedder application may be implemented on a separate computer, such as a server on the Internet accessible via a client application on the user's computer 100. In the former case, the user embeds the watermark into the desired image content on his computer. In the latter case, the client supplies the image content to the server, which performs watermark embedding and returns watermarked images to the client. In both cases, the watermarked objects are created by printing the watermarked images on objects.

The process begins when an embedder 120 creates a registration request. In the system shown in FIG. 2, the embedder 120 is a software application running on the computer 100. The embedder formulates the request in a request file. The system provides a template for the request file. The request file specifies the number of watermark identifiers requested and the names of the media files to be embedded. The file may also specify the behaviors to be associated with each watermark identifier. Alternatively, the user can specify the behaviors to be associated with the watermark identifier at a later time using the methods described in this document. In the case where embedding is performed on a server as opposed to the user's computer, the request file may also include the media file (e.g., an image file) carrying the content to be embedded with the watermark identifier.

Next, the embedder connects, via a network connection, to the registration system 106. In particular, it connects to a registration web site via an Internet connection. This web site requests the embedder's username and password to authenticate it.

The user enters his username and password via a user interface displayed on the PC 100 and submits them to the web site for authentication.

Upon authentication, the registration website 106 returns an HTML page presenting the embedder with a user interface screen that allows the user to locate the embedder's registration request file for uploading to the web site. The user then enters a command to instruct the embedder to upload the selected request file.

The embedder provides the information required to locate the file on the embedder's computer and submits it for upload.

The registration request file is uploaded into a registration loader program 122.

The registration loader 122 performs a quick scan of the uploaded registration request file and reports back to the embedder any errors in format that it detects. If there are errors, the file is not processed.

If the registration request file is properly formatted, the embedder receives a confirmation from the registration website 106 that the request file has been successfully uploaded and will be submitted for processing by the registration loader 122.

The embedder may now either submit a new registration request file or logoff of the registration web site 106.

The registration loader 122 uses the information contained in the embedder's uploaded registration request file to automatically allocate (register) watermark identifiers in a registration database 110. The identifiers are in the form of serial numbers. Once this process is completed, the registration loader 122 initiates a request to a registration extractor 124 for these new registration entries.

Upon receipt of a request, the registration extractor 124 accesses the registration database 110 and creates embedder control files for each of these new registered watermark identifiers (e.g., serial numbers).

Upon completion of this process, the registration extractor 124 process sends the embedder control file(s) back to the embedder via Internet e-mail. In the event that the embedder is server based, the extractor sends the control file(s) (or a pointer to them) to the embedder server 126, which may be integrated with the registration system or implemented at a different Internet site. The extractor 124 also sends an update 128 to the behavior database 114 to create database records associating each of the watermark identifier with a behavior.

Once the embedder 120 has received the embedder control file(s), it uses these file(s), along with the media file(s) (in this case, image files) and a set of embedding instructions to the embedder 120 to instruct the embedder to automatically embed the list of watermark serial numbers included in the embedder control file(s) into the listed media files, producing a set of watermark-embedded media files. In the case where the embedder is server based, the client executing on the PC 100 uploads the media files to be embedded to the embedder server, either directly or as part of the registration process (e.g., as part of the request file). The embedder server then returns the watermarked files to the computer 100 via e-mail or other network file transfer protocol.

For detailed disclosure describing how to embed watermarks in media signals, including images, audio, and video, see U.S. Pat. No. 5,862,260, and co-pending application Ser. No. 09/503,881, filed Feb. 14, 2000, incorporated above.

The embedder may create watermarked objects by printing watermarked images on objects, such as stickers, documents, etc. The embedder sends the watermarked image to a printer 128, which in turn, prints the image on an object.

The above system provides a mechanism for linking objects to machine behaviors. As noted previously, this mechanism applies to both physical objects, like stickers and packaging, and electronic objects, like image, audio and video signals. It also applies to other forms of machine readable signal carriers that can be applied to such objects, including bar codes, magnetic stripes, Radio Frequency tags, integrated circuit chips, organic transistors, etc. These machine readable carriers can be used in the same way that watermarks are used in the example of watermarked enabled stickers above.

While these technologies provide a mechanism for linking objects to machine behaviors, there is a need for a tool that explicitly facilitates the creative coordination between the object and the behavior linked to it. The linking process results in a potentially complex database structure which not only embodies the fundamental object to behavior link, but also might include a hierarchy of delivered responses as a function of user implicit or explicit requests. Or, said in a quite different way, the creative process of linking an object to complex data-driven responses is itself a creative endeavor all to itself, involving thinking through the various different reactions that users will want and expect when using an object as a portal. The artist who is tasked with creating the choreography between an object and a simple or complex machine behavior will need explicit assistance from well designed tools, resulting in a database record which memorializes that creativity as an active element within a connectivity system described in this document and U.S. patent application Ser. No. 09/571,422. The immediate creative output is a database structure. The long term creative output is the active use of that structure as a stimulus-response hub.

Whether a link design tool be web-server based, or whether it be a stand-alone application similar in kind to an Adobe Photoshop or a Quark Express, it is possible to offer visual metaphors to a creative designer which literally presents that designer with an image of the to-be-linked object along with explicit visual links to one or more data responses.

One embodiment of this tool for linking printed objects to web pages is a local computer application which presents an image of a printed object on the left side of an application's window pane and the image of a web page on the right side of the application pane. The images of the printed objects may be stored locally or fetched from a remote device (e.g., a content database) and rendered to the left side of the screen. Similarly, the web pages may be stored locally or downloaded from web sites on the Internet or some other network. The user interface of the application displays a control such as a button, labeled, "Connect", "Link" or some other active word representing the process of associating an object with a corresponding machine behavior. The user, having browsed through a series of objects to be linked, and browsed through a series of potential web site destinations, finding the best "matched-pair", pushes the button and off this relational link goes into a queue waiting to "go live", or, in other words, a temporary record is stored for a candidate link to be sent to the behavior database of the linking system described previously.

A user can perform multiple links per session, queueing them up as they go, reviewing the queue at some point in time, then directing the links to become active at the behavioral database, as described previously and in the referenced documents.

An extension begins by generalizing the single printed item to be an icon or visual analogy to a related set of printed material. Graphical user interface methods can be employed to move, manipulate, view and otherwise process this icon in a fashion familiar to creative professionals. Likewise, surrounding this generalized icon representing the object(s) to be printed can be a whole series of icons representing a variety of potential data-delivered responses that are possible links. Existing web pages, placeholders for web pages to be designed, streaming media icons, Java application icons, "links to links" icons wherein a given response may explicitly point to a menu of actions presented to the end user. (end user=consumer doing the linking). This list of possible responses is incomplete but nevertheless representative of graphically displaying the possible relationships between printed material and data responses.

As in the baseline case, various relationships can be created between objects and responses, ultimately stored into a queue. The actual functionality and quality assurance of the links could be tested in the process. Once the creative artist is satisfied with their link or set of links, the queue can be sent to go live at the behavior database and further double checks on quality performed.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

While the technology is illustrated with reference to watermarked stickers, aspects of the technology apply to other object types including media signals like audio and video. There are number of different watermark embedding and decoding methods that may be used. The watermark embedding process may modulate features of a signal in the time, frequency, spatial or some other transform domain of the signal to be watermarked.

In addition to an object identifier, the watermark may be used to convey other information, such as an index to related metadata, rendering control instructions, etc. For example, the watermark can carry a network address or index to a network address to link the watermarked signal to a network resource such as a related web site.

Other machine readable codes may be embedded in an object and used to link the object to a machine behavior. Some examples include bar codes, magnetic stripes, RF tags, etc. The devices and methods used to extract an identifier from the machine readable code differ, yet the process for registering identifiers and associating behavior with objects may be similar.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A system comprising:
    a registration system configured to:
        receive a registration identifier;
        determine a plurality of watermark identifiers associated with the registration identifier, wherein each watermark identifier is associated with an audio or video object, and wherein the registration identifier is extracted from audible portions of the audio object or visible portions of the video object; and
        receive one of the plurality of watermark identifiers and behavior information; and
    a database, in communication with the registration system, configured to:
        receive the one of the plurality of watermark identifiers and the behavior information from the registration system;
        associate the behavior information with the one of the plurality of watermark identifiers;
        receive a watermark identifier from a remote computer;
        identify behavior information associated with the received watermark identifier, wherein the received watermark identifier corresponds to the audio or video object, and wherein the received watermark identifier is extracted from audible portions of the audio object or from visible portions of the video object; and
        trigger the identified behavior.

2. The system of claim 1, further comprising a processing system configured to extract the watermark identifier from audible portions of an audio object or from visible portions of a video object.

3. The system of claim 2, wherein the processing system is further configured to submit the watermark identifier to the registration system.

4. The system of claim 2, wherein extracting the watermark identifier comprises using a watermark decoding algorithm.

5. The system of claim 2, wherein extracting the watermark identifier comprises using a hashing algorithm.

6. The system of claim 1, wherein the registration system comprises a registration loader configured to scan the received information for errors, and reports back to a submitter of the information about errors that were detected.

7. The system of claim 1, wherein the registration system comprises a registration loader configured to transfer the received information to the database, and communicate registration of the information to a submitter thereof.

8. The system of claim 1, wherein the registration system is configured to receive the behavioral information in XML form.

9. The system of claim 1, wherein the registration system comprises a network interface by which it receives the behavioral information.

10. The system of claim 1, wherein the behavioral information comprises software instructions to execute when the audio or video object is encountered.

11. The system of claim 1, wherein the behavioral information comprises instructions to present a web page to a user when the audio or video object is encountered.

12. The system of claim 1, wherein an address of the registration system is encoded in audible portions of the audio object or visible portions of the video object.

13. A method comprising:
receiving a registration identifier;
determining a plurality of watermark identifiers associated with the registration identifier, wherein each watermark identifier is associated with an audio or video object, and wherein the registration identifier is extracted from audible portions of the audio object or visible portions of the video object; and
receiving one of the plurality of watermark identifiers and behavior information, wherein the one of the plurality of watermark identifiers is extracted from audible portions of the audio object or visible portions of the video object; and
storing the one of the plurality of watermark identifiers in association with behavior information in a database.

14. The method of claim 13, wherein extracting the one of the plurality of watermark identifiers comprises applying a watermark decoding algorithm to the audio or video object.

15. The method of claim 13, wherein extracting the one of the plurality of watermark identifiers comprises applying a hashing algorithm to the audio or video object.

16. The method of claim 13, further comprising receiving one or more items of pertinent information related to the behavioral information.

17. The method of claim 16, further comprising machine-formulating a description of the behavior for entry into the database, based on the behavioral information and the provided items of pertinent information, and storing the machine-formulated description in the database.

18. A method comprising:
providing a collection of audio or video objects based upon a registration identifier, wherein each of the audio or video objects comprises a watermark identifier, wherein the registration identifier is associated with each watermark identifier, wherein the registration identifier is extracted from audible portions of the audio object or visible portions of the video object, and wherein the watermark identifier is encoded in audible portions of the audio object or visible portions of the video object;
controlling the presentation of a graphical user interface that provides a representation of one of the objects, together with a selection of behaviors with which the represented object can be associated;
receiving a user selection of a behavior to be associated with the represented object;
receiving a signal indicating satisfaction with the user selection;
outputting data corresponding to the object and the selected behavior to a data structure, wherein the data comprises the watermark identifier associated with the represented object; and
submitting the data structure to a database that can be consulted to trigger object-specific actions when particular audio or video objects are encountered.

19. A tangible computer-readable medium having instructions stored thereon, the instructions comprising:
instructions to receive a registration identifier;
instructions to determine a plurality of watermark identifiers associated with the registration identifier, wherein each watermark identifier is associated with an audio or video object, and wherein the registration identifier is extracted from audible portions of the audio object or visible portions of the video object; and
instructions to process a received one of the plurality of watermark identifiers and received behavior information, wherein the one of the plurality of watermark identifiers is extracted from audible portions of the audio object or visible portions of the video object; and
instructions to store the one of the plurality of watermark identifiers in association with behavior information in a database.

* * * * *

UNITED STATES PATENT AND TRADEMARK OFFICE
CERTIFICATE OF CORRECTION

PATENT NO. : 8,230,337 B2  
APPLICATION NO. : 11/874054  
DATED : July 24, 2012  
INVENTOR(S) : Rhoads et al.

Page 1 of 1

It is certified that error appears in the above-identified patent and that said Letters Patent is hereby corrected as shown below:

On the Face Page, in Field (57), under "ABSTRACT", in Column 2, Line 10, delete "in a in a" and insert -- in a --, therefor.

On Page 4, in Field (56), under "OTHER PUBLICATIONS", in Column 2, Line 2, delete "Libraties," and insert -- Libraries, --, therefor.

In Fig. 2, Sheet 2 of 2, delete "MEDIA SIGNAL FILE(S) TO BE EMBDDED +" and insert -- MEDIA SIGNAL FILE(S) TO BE EMBEDDED + --, therefor.

Signed and Sealed this  
Fifth Day of February, 2013

Teresa Stanek Rea  
*Acting Director of the United States Patent and Trademark Office*